APPARATUS FOR TAKING SEQUENTIAL PHOTOGRAPHS

Filed Oct. 25, 1960

2 Sheets-Sheet 1

INVENTOR.
OLIVER S. HAMMER
BY Arthur H. Robert
ATTORNEY

APPARATUS FOR TAKING SEQUENTIAL PHOTOGRAPHS

Filed Oct. 25, 1960

INVENTOR.
OLIVER S. HAMMER
BY Archer Robert [signature]
ATTORNEY

United States Patent Office 3,120,160

Patented Feb. 4, 1964

3,120,160
APPARATUS FOR TAKING SEQUENTIAL PHOTOGRAPHS

Oliver S. Hammer, New Albany, Ind., assignor to United Electronics Laboratories, Inc., Louisville, Ky., a corporation of Kentucky Filed Oct. 25, 1960, Ser. No. 64,811
10 Claims. (Cl. 95—15)

This invention relates to apparatus for taking sequential photographs.

Sequence cameras are useful in various applications including commercial, industrial and medical. In banks, stores and other establishments, the use of sequence cameras may deter the commission of crimes such as robbery, shop-lifting, vandalism, etc., and assist in the identification of the criminals. In stores, factories and other places, they are useful in recording the activities of sales persons and workers, the flow of materials and the operation of machines and equipment. In medical clinics and wards, they are useful in recording the activities of patients from which behavior and other data can be developed for clinical and psychiatric ward analyses.

Frequently, the area, desired to be placed under photographic surveillance, is of a size or shape such that the conventional sequence camera cannot adequately cover it. One way of remedying this problem is to use several such cameras stationed at different locations. This has the disadvantages of multiplying the original cost of the equipment, its operating cost and its servicing cost, all in proportion to the number of cameras used.

The principal object of this invention is to provide a relatively simple sequence camera apparatus for keeping a wide area under photographic surveillance without substantially multiplying either the amount of equipment or the cost of manufacturing, operating and servicing it.

Another object is to accomplish the foregoing objectives with a sequence camera apparatus, which can be made, installed, operated and serviced at a cost which is less than that of two conventional sequence cameras, and which has a maximum area of operation substantially greater than that of two conventional sequence cameras.

Another object is to provide a sequence camera apparatus for keeping a wide area under photographic surveillance in a simple, reliable and economical manner.

The primary objects of my invention are achieved by mounting a sequence camera on a turntable for movement therewith over an angle of desired size and arranging the camera to take successive photographs of different portions of the area which it scans within that angle. More specifically, the camera is rotated through an angle embracing the area to be scanned or surveyed and, as it moves through this angle, it is momentarily stopped and operated at each of two or more predetermined positions or stations. The portions thus photographed may be spaced from each other or they may collectively provide a continuous panorama of the entire area embraced within the angle scanned.

Secondary objectives of my invention are: to provide a scanning sequence camera which oscillates back and forth through the scanning angle at one speed during the forward movement and at a substantially higher speed during the return movement; and to enable the lower forward speed to be varied over a wide range while maintaining satisfactory torque conditions.

The secondary objectives of my invention may be achieved by driving the turntable through an A.C. motor which progressively decreases in speed as its operating voltage is progressively lowered and by regulating its voltage through a variable resistor which is shunted by a half-wave rectifier.

The invention is illustrated in the accompanying drawing wherein.

The illustrated photographic apparatus for scanning the area within a predetermined scanning angle and for taking sequential pictures in that area comprises: (*a*) a turntable; (*b*) means angularly moving the turntable back and forth across a predetermined scanning angle; (*c*) a camera mounted on said turntable for angular scanning movement therewith and operative, when actuated, to take a picture; (*d*) means for actuating the camera at one or more predetermined points during the angular forward movement of the turntable through the scanning angle; (*e*) means for simulating a picture-taking operation at one or more predetermined points during the angular forward movement of the turntable through the scanning angle; and (*f*) several miscellaneous circuits.

TURNTABLE

Figure 1:
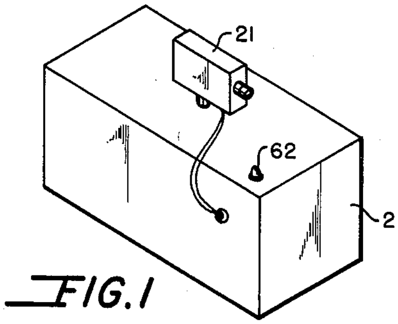
FIG. 1 is a perspective view of the apparatus.
Figure 2:
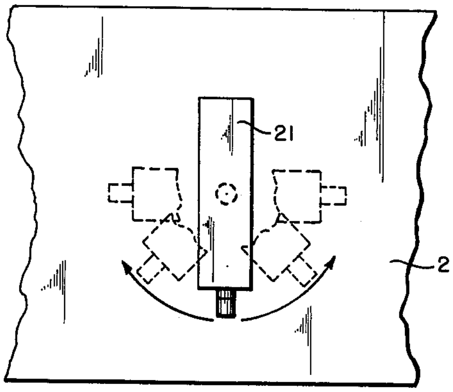
FIG. 2 is an enlarged plan view of the apparatus of FIG. 1 showing the camera in full lines in one picture taking position and in dotted lines in several other picture taking positions along its rotary scanning path.
Figures 3, 4, 5:
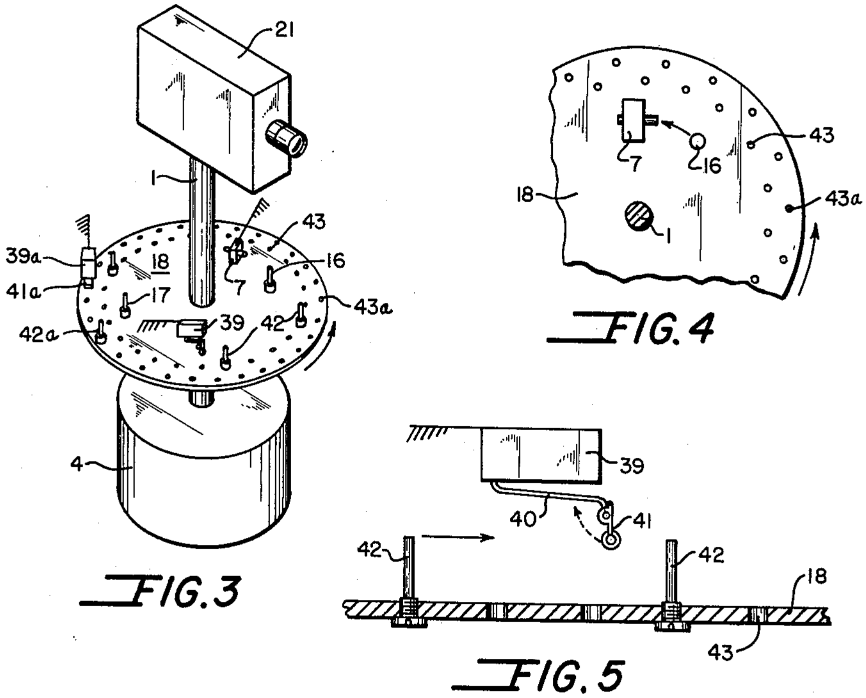
FIG. 3 is an enlarged perspective view showing the camera, its motor-driven turntable and a disc for indexing its operation.
FIG. 4 is an enlarged fragmentary plan view of FIG. 3 showing a segment of the index disc and a turntable-reversing switch assembly.
FIG. 5 is an enlarged elevational view showing a fragment of the index disc and the photo taking switch.

The turntable 1 is in the form of a vertical shaft, also designated 1. This shaft is mounted in suitable bearing means (not shown) for rotation about a vertical axis over a predetermined scanning angle such as the 180° angle indicated in FIG. 2. Preferably the turntable shaft 1 has its lower end portion rotationally mounted within a cabinet 2 with its upper end portion projecting upwardly from the top of that cabinet. The cabinet 2 may be of any suitable shape such as the box-like shape shown.

TURNTABLE MOVING MEANS

The means angularly moving the turntable back and forth through the scan angle includes: a turntable drive motor; and means normally operating the drive motor to oscillate the turntable.

*Turntable Drive Motor*

The turntable 1 may be driven by any suitable motor such as the electric motor 4 shown to which it is directly connected.

While any suitable electric motor 4 may be employed, I prefer the use of a reversible motor and, more particularly, one of the shaded pole type. This type conventionally comprises: a rotor also designated 4; three field windings, namely, one primary winding 5 and two secondary windings 6*f* and 6*r*; and a reversing switch 7 operable, when actuated one way, to close or short circuit secondary winding 6*f* and contemporaneously open secondary winding 6*r* and, when actuated the other way, to open 6*f* and close 6*r*. With the primary field winding 5 energized, the motor 4 runs in the forward direction when the secondary field winding 6*f* is closed, and, in the return direction, when the secondary 6*r* is closed.

Since the turntable motor reversing switch 7 has two operative positions, respectively corresponding to its two terminals "*r*" and "*f*," it may be viewed as two separate switches 7*r* and 7*f* respectively. This type of designation is used herein in connection with other switches having two positions respectively corresponding to two terminals which are specifically designated by different letters, such as "*a*" and "*b*."

*Turntable Motor Operating Means*

The means normally operating the turntable motor to oscillate the turntable includes: a turntable reversing switch; means for moving the turntable one way or the other in accordance with the position of the switch; and means for operating the turntable reversing switch at each end of the scanning angle.

*Turntable reversing switch.*—I prefer the use of the reversing switch 7 since it is conventionally employed on reversible motors of the shaded pole type. However, it will be understood that any suitable form of motor reversing switch may be employed.

*Turntable moving means.*—The means for moving the turntable angularly one way or the other, in accordance with one position or the other of the reversing switch 7, comprises: a turntable motor energizing circuit which is normally operative to energize the primary winding 5. In the embodiment illustrated, the circuit for energizing the turntable motor 4 includes: a main power switch 9 connecting a suitable source of power supply to line wires 10 and 11; a manually operable switch 10*a* in line 10 for connecting this particular apparatus as a whole to (and disconnecting it from) the power source 9 and thereby energizing (and deenergizing) that apparatus; and branch circuit means connecting the primary winding 5 of the turntable motor 4 across line wires 10 and 11.

The branch circuit means preferably includes: a manually adjustable resistance or rheostat 12 for adjusting the voltage across the primary winding 5 and thereby correspondingly adjusting the speed of rotor 4. Since it may be desirable to operate the motor 4 in the forward and return direction at different (relatively low and high) speeds, the branch circuit arrangement preferred and illustrated, which uses the rheostat 12 to control the forward speed of the motor, includes: another parallel rheostat 13 to control the return speed of the motor; and a two position speed-change switch 14 which functions to switch the rheostats 12 and 13 alternately into and out of the branch circuit for the primary winding 5.

A very wide range of speed control is highly desirable. Unfortunately, however, as the voltage is progressively lowered to effect a progressive lowering of the speed, the torque conditions of turntable motor 4 are progressively weakend at a rate very seriously restricting the speed control range. Quite unexpectedly I have found that the range of speed control obtainable with rheostats 12 and 13 can be very substantially increased and satisfactory torque conditions maintained at the lower speeds by shunting a rectifier 15 across the branch circuit arrangement. I am not able to explain, with certainty, the reason why the parallel rectifier circuit enables the speed differential obtainable between the high speed rheostat 13 and the low speed rheostat 12 to be widened in substantial measure but I believe that it is due, at least in part, to the fact that the rectifier 15 permits the full A.C. line voltage to be applied to the primary winding 5 on every other alternation of the commercial current. Thus with 60 cycle current, the primary winding 5 would receive the full voltage 60 times per second in one direction and the lowered voltage 60 times per second in the opposite direction. Accordingly, my preferred embodiment includes: a branch circuit for the primary winding 5 having rheostat 12 in series with speed-change switch 14*a* during the forward movement and rheostat 13 in series with speed-change switch 14*b* during the return movement; and rectifier 15 in parallel with that branch circuit.

*Reversing switch operating means.*—The simultaneous operation of the reversing switch 7 and speed-change switch 14 at each end of the scanning angle is necessary. It may be simply accomplished by connecting or "ganging" switches 7 and 14 together so that both move in unison and by fixedly mounting these ganged switches in operative relation to a pair of switch operating members 16 and 17 which are mounted on the turntable for angular movement along predetermined arcuate paths such that member 16 operates them at the end of the forward movement and switch operating member 17 operates them at the end of the return movement. Accordingly, the switch operating members are mounted on a disc 18, which is fixed to the turntable 1 to oscillate therewith, and spaced angularly apart a distance corresponding to the (180°) scanning angle. The speed change switch 14 is ganged with reversing switch 7 by conventional means not shown although indicated in FIG. 6 by dotted line 19.

In the present case, the scanning angle is assumed to equal 180° but of course it may be increased or decreased between maximum and minimum limits of practical size. Where the scanning angle approximates 360°, the use of one switch operating member 16 or 17 may suffice.

The turntable reversing switch 7 is fixedly mounted on the cabinet 2 in a position such that it is operatively engaged, on one side, by member 16 at the end of the 180° forward movement, and, on the other side, by member 17 at the end of the 180° return movement.

SEQUENCE CAMERA

While any suitable sequence camera may be mounted on the turntable for angular scanning movement therewith so long as it is operative, when actuated, to take a satisfactory picture, I prefer a camera of the character shown in my copending U.S. application S.N. 835,246, filed Aug. 31, 1959. This preferred camera 21 houses a picture-taking mechanism comprising: a shutter 22; a film reel 23; a switch operating cam 24; stop switch 25; and camera operating motor 26.

The camera operating motor 26 is automatically operative, when energized, to actuate the picture-taking mechanism of the camera and then, when a picture is taken, shut that mechanism down. More specifically, when the camera motor 26 is energized, it functions: (*a*) to actuate the picture-taking mechanism and thereby cause it to take a picture by opening the shutter 22 momentarily so as to expose a picture-taking frame on the film from reel 23 and by feeding an unexposed frame of the film from reel 23 into operative position either before or after the shutter 22 is momentarily opened; and then (*b*) to shut the picture-taking mechanism down at the end of the picture-taking operation by operating cam 24 to open stop switch 25 and thereby stop the camera motor 26 at that time.

The camera 21 is mounted on the projecting upper end of the turntable 1 to oscillate or move angularly therewith across the scanning angle.

PHOTOGRAPH INITIATING MEANS

The means for actuating the camera at a predetermined point during the angular forward movement of the turntable includes: motor control means operative, when actuated, to stop the turntable motor and start the camera motor; and turntable controlled means operative, when said turntable reaches said predetermined picture-taking point, to actuate said control means.

*Motor Control Means*

The motor control means includes: a normally closed stop switch operative, when opened, to stop the turntable motor; a normally open start switch operative, when closed, to start the camera motor; and a stop-start motor relay operable, when actuated, to stop the turntable scanning movement by opening the turntable stop switch and simultaneously start the camera picture-taking operation by closing the camera start switch.

Figure 6:
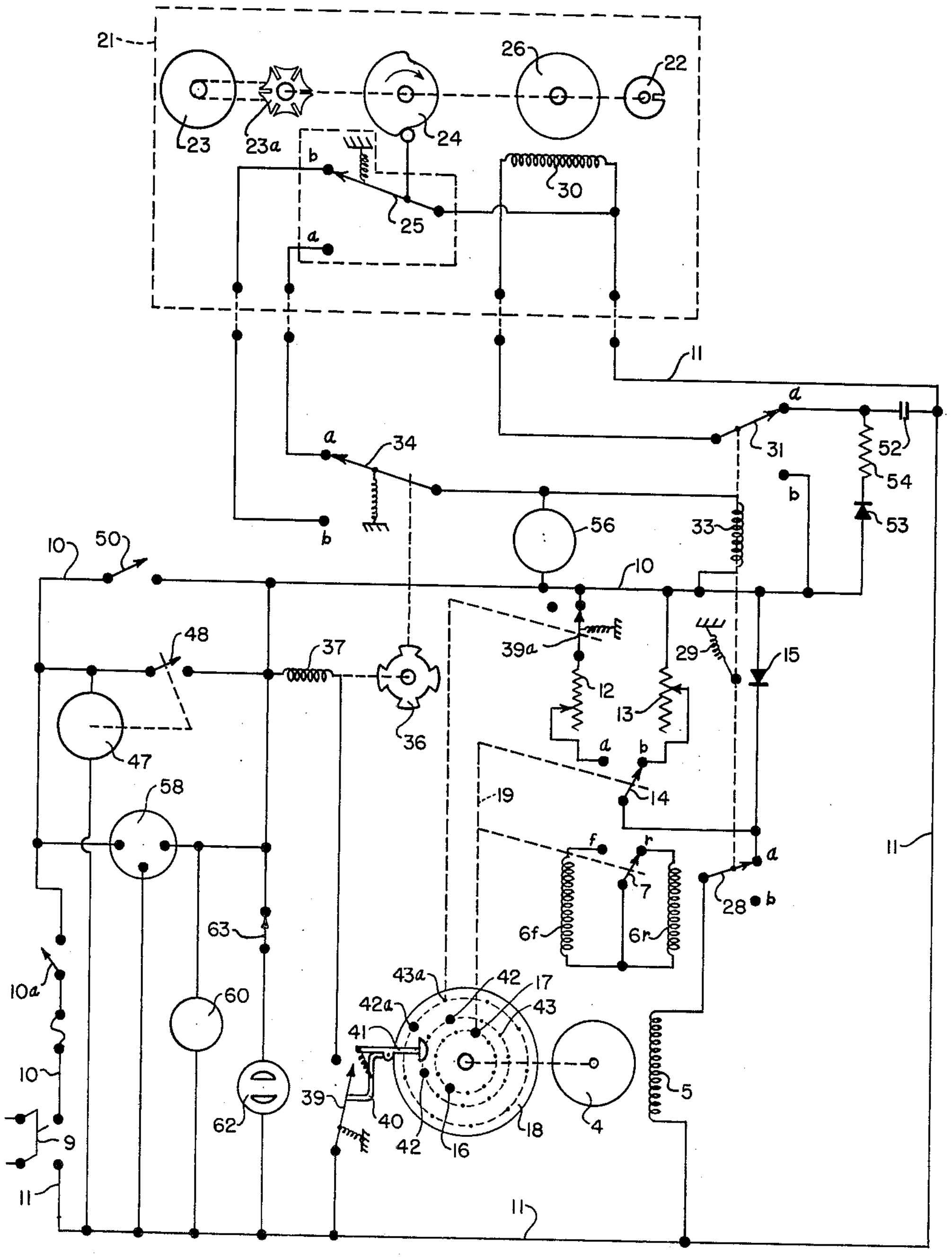
FIG. 6 is a combination wiring diagram and schematic view of the electrical elements of the apparatus.

*Normally closed turntable stop switch.*—The turntable motor operating circuit, which includes the primary field winding 5, serially contains a normally closed stop switch 28 (or 28a) arranged, in FIG. 6 between primary winding 5 and speed-change switch 14. This stop switch is biased toward and normally held in its normally closed 28a position by spring 29.

*Normally open camera start switch.*—The camera motor operating circuit serially includes the field winding 30 of the camera motor and a normally open start switch 31b which is also biased toward and normally held in its open (or 31a) position by spring 29.

*Stop-start motor relay circuit.*—The stop-start motor relay, which is operative, when actuated, to stop the turntable motor and simultaneously start the camera motor comprises: solenoid coil 33 operative, when energized, to stop the turntable motor 4 by opening its normally closed switch 28a and simultaneously to start the camera motor by closing its normally open switch 31b; and a normally open switch 34 operative, when closed, to effect the energization of the solenoid 33. As seen in FIG. 6, the circuit of solenoid 33 extends from the high side of the line 10 successively through solenoid coil 33, one side or the other of switch 34 and the corresponding side of camera motor stop switch 25, to the low side 11 of the line.

It should be noted that switches 25 and 34 are interconnected by two parallel branch line wires to form a 3-way switch arrangement wherein: switch 34 functions, when operated, to close one branch line through switch 25 at one time while switch 25 functions, when operated at a later time, to open that one branch line and contemporaneously condition the other branch line for closure upon the next operation of switch 34. Each time one branch line is closed by switch 34, the stop-start motor relay 33 will be energized. Each time a branch line is opened by switch 25, that stop-start relay 33 will be de-energized. In other words, the operation of switch 34 marks the beginning of a picture-taking operation while the subsequent operation of switch 25 marks the end of that picture-taking operation. The operation of switch 34 is controlled by the turntable controlled means.

*Turntable Controlled Means*

The turntable controlled means comprises: a picture relay operative, when energized, to operate 3-way switch 34 and thereby actuate the stop-start motor relay to institute the next picture-taking operation; a normally open picture switch controlling the picture relay; and a picture switch operation member on the turntable for closing the picture switch when the turntable reaches a desired picture-taking position.

*Picture relay.*—The picture relay comprises: an indexer 36, which is adapted to be advanced one position each time it is actuated and which is operatively connected to the 3-way switch 34 so that, when actuated, it causes that switch to be operated to its next alternately closed position; and a solenoid coil 37 which is operative, each time it is energized, to advance the indexer 36 one position and thereby effect a corresponding operation of 3-way switch 34.

*Normally open picture switch.*—The circuit for operating the solenoid coil 37 of the picture relay serially includes a normally open picture switch 39 which is operative, when closed, to complete the circuit of that solenoil 37. The switch 39 preferably is fixedly mounted on the cabinet 2 (i.e. a chassis within cabinet 2,) with its switch operating arm 40 operatively positioned in relation to the turntable. This arm 40 has a pivotally depending outer and lower end portion 41 which, when urged in the forward direction of turntable movement, will cause the switch operating arm 40 to close picture switch 39. However, if the pivotally depending arm 41 is urged in the return direction of the turntable, it will simply swing pivotally to one side without causing the arm 40 to close the picture switch 39. The closure of the normally open picture switch is controlled by switch operating means on the turntable.

*Picture-switch operating means.*—The picture-switch operating means comprises a switch operating member 42 mounted on the disc 18 in position for operative engagement with the end portion 41 of switch arm 40 during forward movement and thereby close picture switch 39 when the forwardly moving operating member 42 reaches a position corresponding to the desired picture-taking position. Since more than one picture will normally be taken during the forward movement of the camera through the scanning angle, more than one switch operating member 42 will normally be required. Accordingly, the disc 18 is provided with a circular series of spaced perforations 43 so that one switch operating member 42 may be placed in each of a selected number of these perforations to effect a corresponding number of picture-taking operations during the forward movement of the camera through the scanning angle.

PHOTOGRAPH SIMULATING MEANS

It may be desirable, in some instance, to simulate a picture taking operation at a predetermined point in the forward angular travel of the camera by stopping the camera at that point without operating its picture-taking mechanism. To this end, a means for simulating the taking of a photograph is provided which comprises: a normally closed auxiliary switch operable, when opened, to stop the turntable; an auxiliary switch operating member on the turntable for opening the auxiliary switch when the turntable reaches a desired angular position; and a turntable motor creeping circuit operable, when the forward turntable motor circuit is opened by the auxiliary switch, to cause the turntable motor to creep slowly until the auxiliary switch is again closed to close the forward turntable motor circuit.

*Normally Closed Auxiliary Switch*

The switch 39a is identical in all respects to the switch 39. Structurally it has an operating arm 40a with a pivotally depending end portion 41a. Operationally, it is controlled by auxiliary switch operating means on the turntable.

*Auxiliary Switch Operating Means*

The auxiliary switch operating means is identical to the picture switch operating means and therefore comprises one or more switch operating members 42a removably mounted in one or more of a second circular series of spaced perforations 43a so as to be in position for operative engagement with the end portion 41a of switch arm 40a during forward movement and thereby close auxiliary switch 39a when a forwardly moving operating member 42a reaches a position corresponding to a desired picture-simulating position within the scanning angle.

*Turntable Creeping Circuit*

The turntable creeping circuit, which functions to apply a pulsating direct current to the primary winding 5 of turntable motor 4 and thus cause it to move forwardly a small amount with each pulse, extends from the high side 10 successively through rectifier 15, normally closed turntable stop switch 28a and primary winding 5 to the low side 11 of power. So long as the turntable motor 5 is energized through the branch circuit (i.e. rheostat 12 of the forward circuit or rheostat 13 of the return circuit), the rectifier 15 is operative for speed control purposes but relatively inoperative for turntable creeping purposes. However, when the forward circuit is closed at speed-change switch 14a but open at auxiliary switch 39a, the rectifier 15 is operative to permit the flow of the D.C. pulse current which causes the turntable motor to creep.

MISCELLANEOUS CIRCUIT MEANS

There are a number of miscellaneous circuits which form no part of the present invention but which, for the sake of completeness, are identified and described as follows: a clock circuit comprising a clock 47 connected across the line and operative to energize and deenergize the apparatus as a whole through a switch 48; a bypass circuit in the form of normally open switch 50 which functions, when closed, to short-circuit the clock controlled switch 48; a camera-motor-braking D.C. circuit to brake the motor 26 to a fast stop when its operating circuit is opened by switch 31*b*, this braking circuit comprising a D.C. charged condenser 52 serially connected by switch 31*a* to discharge through the field 30 of camera motor 26 immediately following the opening switch 31*b*; a D.C. charging circuit for condenser 52 extending from line 10 successivley through rectifier 53, resistor 54 and braking condenser 52 to line 11; a counter circuit to record the number of photographs taken by the camera and thus enable an operator to determine when the camera film should be changed, this circuit containing an electrical recording counter 56 of conventional type in parallel with the stop-start relay 33 so as to be energized each time that relay is energized; a remote control circuit to enable the apparatus to be operated by controls at a remote station, this circuit including a socket 58 having one connection to the low side of the line and two connections to the high side thereof, one for each side of the clock controlled and bypass switches 48 and 50, the socket 58 cooperating with a corresponding plug, a remote set of controls and an interconnecting cable, none of which is shown; a fan circuit having a fan 60 placed across the line, preferably on the apparatus side of the clock controlled and bypass switches 48 and 50, to operate only when the apparatus is energized and functioning, when operated, to cool the interior of the cabinet 2; and a pilot light circuit having a pilot light 62 and serially connected switch 63 placed across the power line parallel to fan 60 and functioning to indicate that the apparatus is in operation.

OPERATION

At the outset, we assume: that the apparatus was shut down when it had just finished taking a picture with the turntable at the very beginning of its return movement; that the clock controlled and bypass switches 48 and 50 are open; and that the pilot light switch 63 is closed. With these assumptions, the circuit will appear as shown in FIG. 6.

We next assume either that an operator now closes bypass switch 50 or that the clock 47 has just closed the time controlled switch 48. This energizes the fan 60, pilot light 62, and the turntable motor rectifier and return circuits which extend in parallel through rectifier 15 and the branch circuit (containing rheostat 13 and switch 14*b*) and serially through switch 28*a* and primary winding 5. Normally the return circuit will be adjusted by rheostat 13 to apply, to primary winding 5, an operating voltage equalling or approaching the line voltage so as to insure the rapid return of the turntable to the starting point of the forward motion.

During the return movement, the operating members 42 and 42*a* will strike the pivoted end portions 41 and 41*a* of their respective picture and auxiliary switches 39 and 39*a* but these switches will not operate since the pivoted arms 41 and 41*a* are merely pivotally moved and thus brushed aside.

Ultimately the turntable reaches the end of its return movement and, at this point, the switch operating member 17 on disc 18 operates the reversing switch 7 from its 7*r* position to its 7*f* position and, is doing so, causes the speed-change switch 14 simultaneously to move from its 14*b* position to its 14*a* position. These switch operations cause the turntable motor 4 to rotate in the forward direction at the slower speed determined by the setting of rheostat 12.

As the turntable rotates forwardly, the first operating member 42 ultimately closes its picture switch 39 to energize the picture relay coil 37 which acts through indexer 36 to close the open 3-way switch 34*b* in the circuit of stop-start motor relay solenoid coil 33 and counter 56. The resulting energization of solenoid coil 33 stops the turntable by opening the stop switch 28*a* of the turntable motor 4 and starts the camera by closing the start switch 31*b* in the circuit of its motor field winding 30.

In taking a picture, the camera motor 26 rotates its cam 24 one-half turn. During the time required for this half turn, the shutter 22 completes one full rotation and, in doing so, momentarily exposes an unexposed frame on the film from reel 23. Before or after this picture-taking operation but during the said half turn of cam 24, the picture-taking mechanism advances the film on film reel 23 one frame through the Geneva mechanism 23*a*. At the end of said half turn, the camera motor shuts itself down and conditions the 3-way arrangement for the next picture-taking operation by operating 3-way switch 25 from its '*b*" position to its "*a*" position.

This opening of 3-way switch 25*b* deenergizes the solenoid coil 33 of the start-stop relay permitting spring 29 to snap turntable switch 28 and the camera switch 31 to their "*a*" positions. The closure of braking switch 31*a* connects condenser 54 to discharge a direct current impulse through field winding 30 and thereby stop camera motor 26 more or less instantaneously. The contemporaneous closure of switch 28*a* causes the turntable to start rotating once again in the forward direction. During the forward movement of the turntable, these operations are repeated at each successive picture-taking station.

We now assume that provision has been made for a photo-simulating operation at some point in the forward movement of the turntable. When switch operating member 42*a* reaches that point, it will operate switch 39*a* to disconnect primary winding 5 from the branch circuit, which contains rheostat 12, but leave the primary winding 5 serially connected with rectifier 15 across the line. The winding will now receive only one pulse instead of two during each cycle of alternating current and these spaced pulses will ultimately cause motor 4 to move disc 18 enough to carry operating member 42*a* beyond spring-biased switch 39*a*. Now the spring will reclose switch 39*a* and reestablish the forward rotation of the turntable. From all outward appearances, however, the camera stopped during that interval to take a picture.

Ultimately the turntable reaches the end of its forward movement where operating member 16 on disc 18 once again reverses switches 7 and 14 to institute the rapid return motion.

It will, of course, be understood that picture-taking operations may be instituted during both forward and return movements of the turntable.

Having described my invention, I claim:

1. A photographic apparatus for scanning an area within a predetermined scanning angle and for taking sequential pictures therein, comprising:

(A) a turntable;
(B) motorized operating means for angularly moving the turntable back and forth, including
  (1) a turntable motor,
  (2) a turntable reversing switch, and
  (3) means normally causing the turntable motor to oscillate the turntable back and forth in accordance with the position of the reversing switch, including
    (*a*) means for operating the turntable reversing switch at each end of the scanning angle;
(C) a camera mounted on the turntable to be moved thereby across a predetermined scanning angle,
  (1) said camera being operative, when actuated, to take a picture; and (D) means for periodically actuating the camera at one or more predetermined points in the scanning angle during its movement through the scanning angle.

2. The apparatus of claim 1 wherein: said means for oscillating the turntable motor is operative to drive the turntable one way at one predetermined constant speed and the other way at a different predetermined constant speed.

3. The apparatus of claim 2 wherein said means for oscillating the turntable motor includes: electrical circuit means for energizing the turntable motor to render it operative to drive the turntable in one way and the other; impedance means capable of providing said circuit means with different degrees of impedance corresponding to said different turntable speeds; speed change means operative, when actuated one way, to provide said circuit means with one degree of said impedance means and, when actuated another way, to provide it with a different degree of said impedance means; and means for actuating the speed change means one way at one end of the scanning angle and the other way at the other end thereof.

4. The apparatus of claim 3 wherein: said speed change means includes a speed change switch movable, when actuated one way, to one position and, when actuated another way, to another position; said circuit means is adapted to be energized with alternating current; and said circuit means includes one degree of said impedance means serially connected with said speed change switch in said one position and the other degree of said impedance means serially connected with said speed change switch in said other position, and a rectifier connected across that portion of said circuit means which serially includes said impedance means and said speed change switch.

5. The apparatus of claim 3 wherein the camera includes: a picture-taking mechanism; and a camera motor operative, when the camera is actuated, to actuate the picture-taking mechanism of the camera and then, when a picture is taken, shut the mechanism down.

6. The apparatus of claim 3 wherein: the camera includes a camera motor; and the camera actuating means includes a motor control means operative, when actuated, to stop the turntable motor and start the camera motor, and turntable controlled means operative, when said turntable reaches a predetermined picture-taking point, to actuate said control means.

7. The apparatus of claim 6 wherein the motor control means includes: a normally closed turntable stop switch operative, when opened, to stop the turntable motor; a normally open camera start switch operative, when closed, to start the camera motor; and a stop-start motor relay operable, when actuated, to stop the turntable scanning movement by opening the turntable stop switch and simultaneously start the camera picture-taking operation by closing the camera start switch.

8. The apparatus of claim 7 wherein the turntable controlled means includes: a picture relay operative, when energized, to actuate the stop-start motor relay so as to institute a picture-taking operation; a normally open picture switch controlling the energization of the picture relay; and a picture switch operation member on the turntable for closing the picture switch when the turntable reaches a desired picture-taking position.

9. The photographic apparatus of claim 2 including means for simulating a picture-taking operation at a selected position during the angular movement of the camera through the scanning angle.

10. The apparatus of claim 9 wherein the means for simulating the taking of a photograph comprises: a normally closed auxiliary switch operable, when opened, to stop the turntable at said selected position; an operating member on the turntable for opening the auxiliary switch when the turntable reaches said selected position; and turntable creeping means operable, when the auxiliary switch has been opened to stop said turntable at said selected position, to actuate the turntable moving means in a manner causing it to creep slowly until, the turntable passes beyond said selected position to an extent sufficient to enable the auxiliary switch to reclose and thereby reinstitute the turntable movement.

References Cited in the file of this patent

UNITED STATES PATENTS

| | | |
|---|---|---|
| 1,809,338 | Hayden | June 9, 1931 |
| 1,967,468 | Douglass | July 24, 1934 |
| 2,348,841 | Oswald | May 16, 1944 |
| 2,648,252 | Stancliff | Aug. 11, 1953 |
| 2,941,459 | Fairbanks | June 21, 1960 |

FOREIGN PATENTS

| | | |
|---|---|---|
| 656,180 | Germany | Jan. 31, 1938 |